US008554634B2

(12) United States Patent
Lewin (10) Patent No.: US 8,554,634 B2
(45) Date of Patent: Oct. 8, 2013

(54) METHODS AND SYSTEMS FOR ISSUING TICKETS

(76) Inventor: Nick Lewin, New York, NY (US)

( * ) Notice: Subject to any disclaimer, the term of this patent is extended or adjusted under 35 U.S.C. 154(b) by 125 days.

(21) Appl. No.: 13/075,113

(22) Filed: Mar. 29, 2011

(65) Prior Publication Data

US 2012/0253983 A1 Oct. 4, 2012

(51) Int. Cl.
*G06Q 30/00* (2012.01)
(52) U.S. Cl.
USPC .......................... 705/26.1; 705/27.1
(58) Field of Classification Search
USPC ............................... 705/26.1, 27.1
See application file for complete search history.

(56) References Cited

U.S. PATENT DOCUMENTS

| 5,489,096 | A | 2/1996 | Aron | 273/138 |
|---|---|---|---|---|
| 6,067,532 | A | 5/2000 | Gebb | 750/37 |
| 7,228,419 | B2 * | 6/2007 | Iino | 713/170 |
| 2003/0110046 | A1 | 6/2003 | Cofta | 705/1 |
| 2003/0220813 | A1 | 11/2003 | Gurvey | 705/1 |
| 2005/0049888 | A1 | 3/2005 | Eisenberg et al. | 705/1 |
| 2005/0049936 | A1 | 3/2005 | Shaw | 705/26 |
| 2005/0181859 | A1 | 8/2005 | Lind et al. | 463/17 |
| 2005/0240453 | A1 * | 10/2005 | Lyons | 705/5 |
| 2005/0252056 | A1 | 11/2005 | Harline et al. | 40/661 |
| 2006/0026739 | A1 | 2/2006 | Kronenbeger | 2/209.13 |
| 2007/0220785 | A1 | 9/2007 | Forgione et al. | 40/27 |
| 2007/0276944 | A1 | 11/2007 | Samovar et al. | 709/225 |
| 2008/0222029 | A1 | 9/2008 | Poster | 705/39 |
| 2009/0228372 | A1 | 9/2009 | Jooste et al. | 705/27 |
| 2009/0313053 | A1 | 12/2009 | Gengarella et al. | 705/5 |
| 2010/0070312 | A1 | 3/2010 | Hunt | 705/5 |
| 2010/0082491 | A1 | 4/2010 | Rosenblatt et al. | 705/65 |
| 2010/0100434 | A1 | 4/2010 | Sock | 705/14.38 |
| 2010/0133339 | A1 | 6/2010 | Gibson | |
| 2010/0312587 | A1 * | 12/2010 | Benson et al. | 705/5 |

FOREIGN PATENT DOCUMENTS

| JP | 005011041 | 8/2008 |
|---|---|---|
| JP | 2006215742 | 8/2008 |

OTHER PUBLICATIONS

Securing Uniqueness of Rights e-Documents: A Deontic Process Perspective, Lee, Ronald M; Nguyen, Vu; Pagnoni, Anastasia, Journal of Theoretical and Applied Electronic Commerce Research3. 3 (Dec. 2008): 83-102, downloaded from ProQuest Direct on the Internet on Dec. 12, 2012, 16 pages.*
New Ticketmaster.com Electronic Ticketing Service Will Give Online Consumers the Edge by Allowing Them to Purchase, Print Out Ticketmaster Tickets at Home, PR Newswire [New York] Jan. 25, 2000: 1, downloaded from ProQuestDirect on the Internet on Dec. 12, 2012, 3 pages.*
International Search Report and Written Opinion, Application No. PCT/US2012/028230, mailed Jun. 22, 2012.
Webpage: NHL.com Mar. 23, 2010 News: Pittsburgh Penguins: Penguins Add 'Commemorative Ticket' Giveaway to Final Regular Season Game at Mellon Arena.

(Continued)

*Primary Examiner* — James Zurita
(74) *Attorney, Agent, or Firm* — Winston & Strawn LLP (57) ABSTRACT

Methods and apparatus for issuing tickets for events are disclosed. In an embodiment, a method includes providing a ticket purchaser with both an electronic ticket and a duplicate replica ticket. The replica ticket provides the user a piece of memorabilia, without presenting the issue of having multiple tickets capable of being used for entry. In an additional embodiment, the replica ticket can also be used to gain access to the event.

17 Claims, 11 Drawing Sheets

(56) References Cited

OTHER PUBLICATIONS

Webpage: LSUsports.net Oct. 29, 2009 Football: Ticket Office Offers Commemorative Season Ticket Sheet.
Webpage: A's Ticket Services.mlblogs.com Aug. 8, 2008; Commemorative Ticket Stock Carefully Selected.
Article: Top Issues About StubHub Jun. 10, 2010.
Article: SuperbowlTicketCollector.com, Examples of "block tickets".

* cited by examiner

METHODS AND SYSTEMS FOR ISSUING TICKETS

FIELD OF THE INVENTION

The invention generally relates to a system for offering, purchasing, and generating tickets, such as for live events.

BACKGROUND ART

The advent and acceptance of electronic tickets, or e-tickets, has simplified the process for spectators and event attendees, allowing them to receive tickets by e-mail and print a proof of purchase from their computer. In addition, new systems have allowed users to use an electronic ticket's bar code, or similar authentication mark, to enter an event.

Although these advancements have alleviated a spectator's need to maintain paper tickets, they also have robbed spectators of a valuable part of the ticketing process. Unique paper tickets are a valuable keepsake by which a spectator can remember their attendance at a particular event. In addition, paper tickets can have value among sports memorabilia collectors or have sentimental value. Electronic tickets or "e-tickets," in general, do not have the same look and feel or quality as an actual ticket printed for the event.

Systems for generating tickets are known for use with respect to events such as concerts and sports matches, but none are intended, for example, to provide replica tickets alongside electronic tickets, to compensate for the void created by the electronic ticketing process.

SUMMARY OF THE INVENTION

Methods and apparatus for generating offering, purchasing, and replica tickets for an event such as a concert or sports match are provided. The replica tickets are designed to have the exact look and feel of the paper tickets issued for the event. One method includes software which provides the ticket purchaser the option to receive a replica ticket via e-mail and print it from a local computer. In an alternative embodiment, software provides the ticket purchaser with the option to receive a replica ticket in the mail. In additional embodiments, the software will notify the event coordinator that only the electronic ticket will be valid for entry, thus ensuring that the ticket purchaser cannot use both their electronic ticket and replica ticket. In further embodiments, both the electronic ticket and replica ticket may be used for entry to the event, but the event coordinator uses software to ensure that only one is used to gain entry. Finally, if the replica tickets are issued alongside electronic tickets, they may be given authentication numbers. Users can query a website using this authentication number to determine if the replica ticket is valid for entry to the event, or intended solely for the purpose of memorabilia. Online e-ticket customers can be presented with an interactive option (e.g., via an interface) when they are purchasing an e-ticket for attending an event. The option, for example, offers the customer a replica ticket to purchase as an "add-on" item to purchasing a corresponding e-ticket. The physical replica ticket can be delivered by physical delivery (e.g., a shipping service, at the event, etc.) or electronically (e.g., the purchaser prints a physical replica ticket).

BRIEF DESCRIPTION OF THE DRAWINGS

Other aspects, purposes, and advantages of the invention will become clear after reading the following detailed description with reference to the attached drawings, in which.

DETAILED DESCRIPTION OF THE PREFERRED EMBODIMENTS

Figure 1:
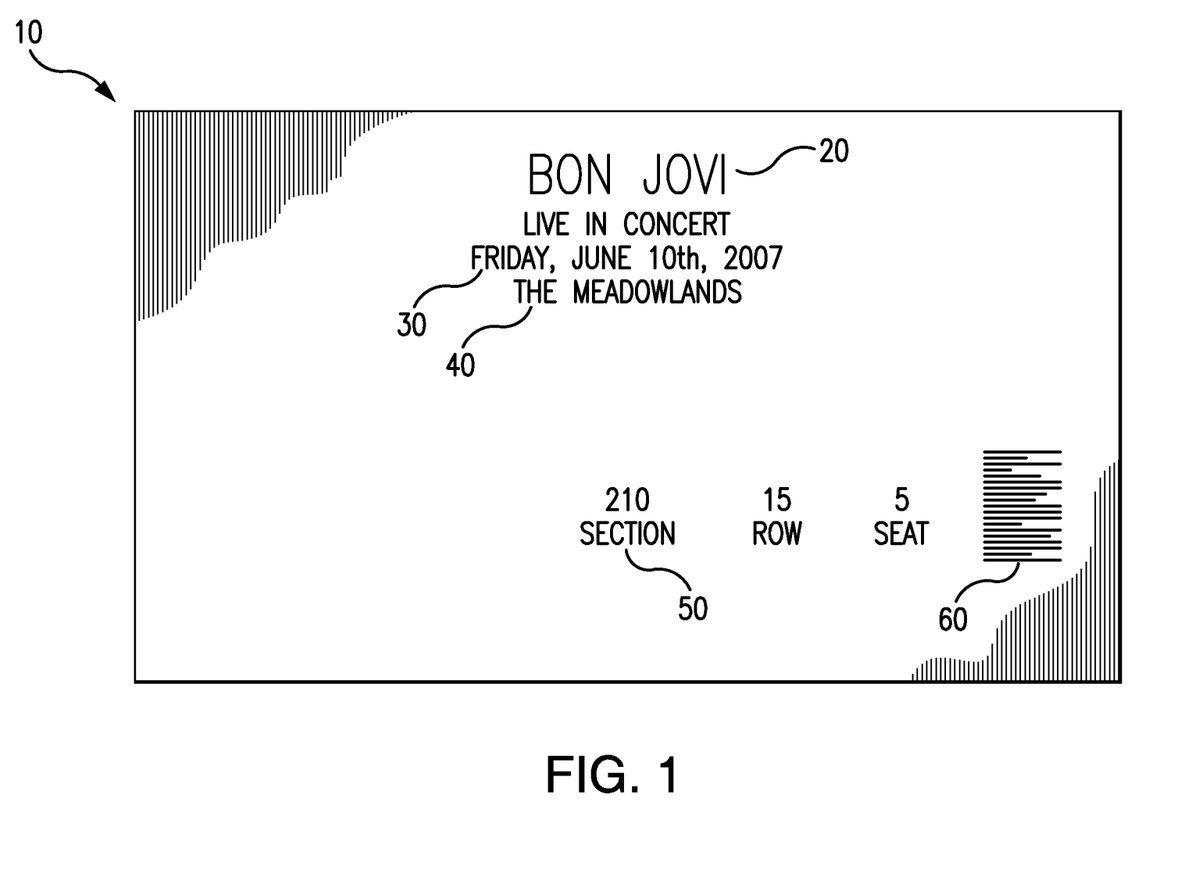
FIG. 1 illustrates a conventional paper ticket for an event such as a concert or sports match.
Figure 1A:
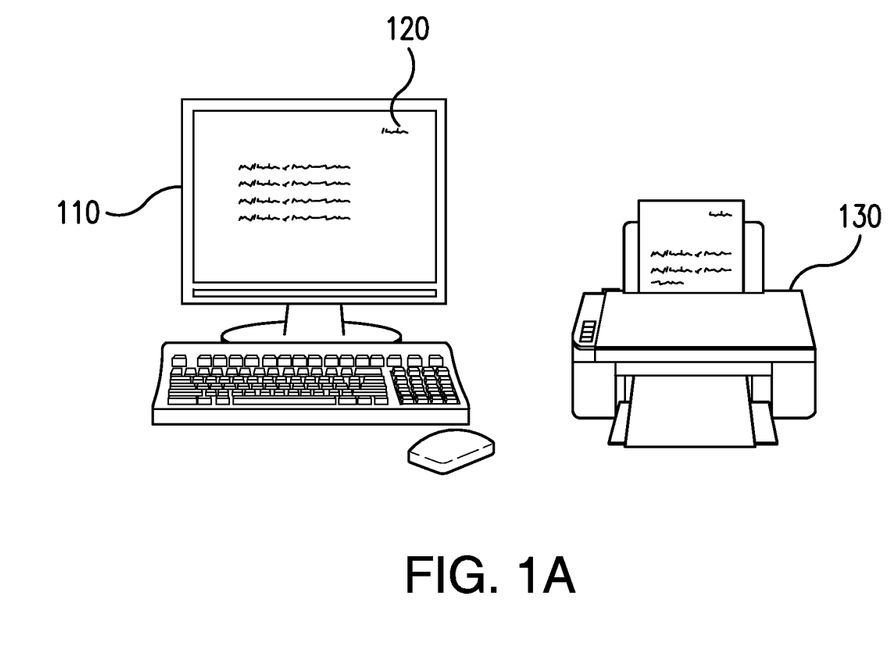
FIG. 1a. illustrates the existing technology in which an electronic ticket, or e-ticket, is received by a user at their computer.

FIG. 1 illustrates a conventional paper ticket 10. Such tickets have been commonly used to facilitate a reservation for events such as concerts, plays and sports matches and are typically professionally printed (e.g., using card stock). Ticket 10 contains event information regularly included on such tickets, including event name 20, event date 30, event location 40, and section, seat and row assignment 50. In addition, many modern day tickets include a bar code 60, which can be scanned by ushers at the event to guarantee authenticity. Such tickets typically include graphics (e.g., in color) such as logos or images (e.g., image of a stadium or the entertainer) and can include one or more authenticity protections (e.g., a bar code). Tickets such as these have largely been replaced by electronic tickets, or e-tickets.

Figure 2:
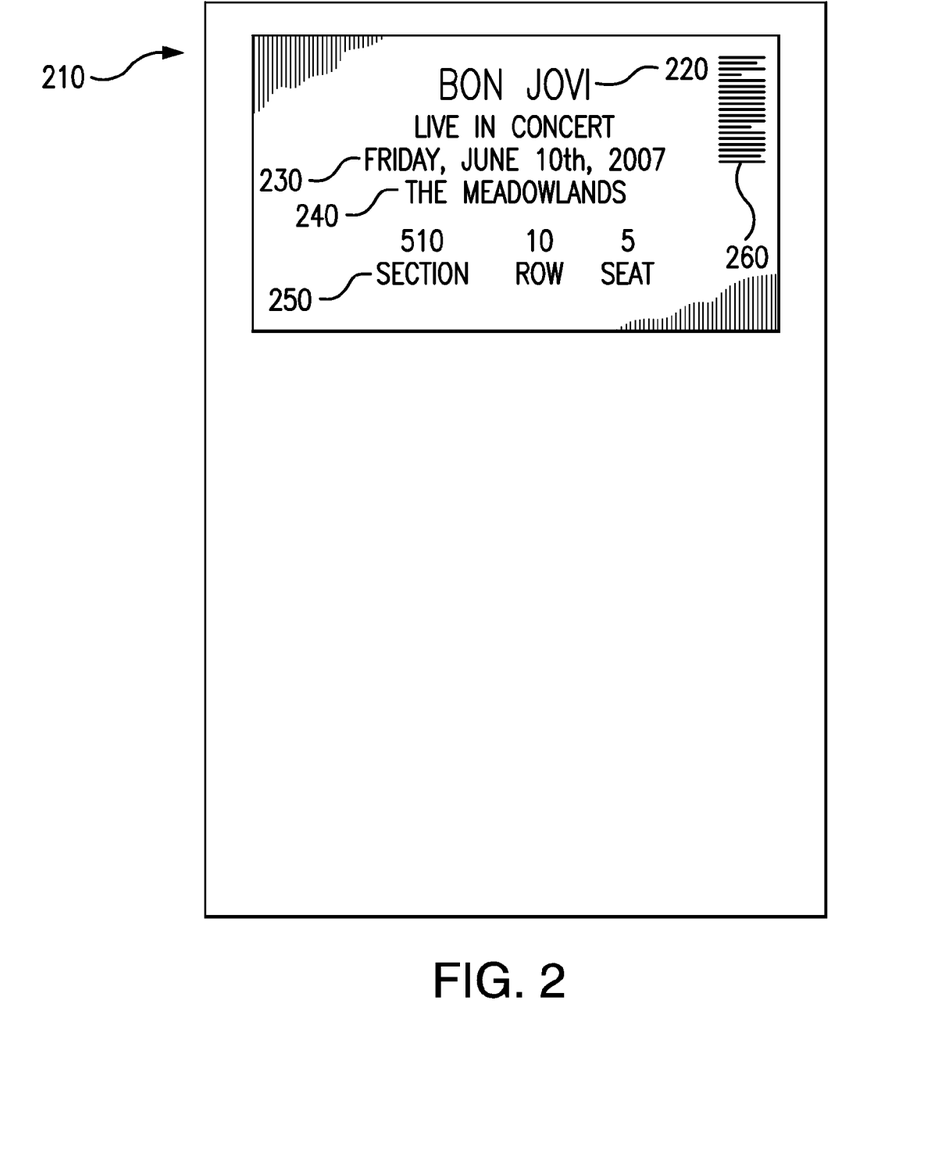
FIG. 2 illustrates a conventional electronic ticket as is known in the art.

FIG. 2 illustrates an existing system by which a ticket purchaser can obtain an electronic ticket. This method requires a computer 110, or other similar device that can access the Internet, and software, such as an Internet browser 120, that can be used to access the ticket vendor's website and make a purchase. The ticket purchase is confirmed by either providing an electronic ticket in the browser, or sending it to the ticket purchaser's e-mail address. After the ticket purchaser has received the ticket, they may print it out on printer 130. This printout can be used to gain access to the event. In the alternative, the ticket purchaser may access their electronic ticket on a portable computer or smart phone, and present the electronic version to gain entry to the event.

FIG. 2a illustrates an example of an electronic ticket 210. The electronic ticket includes event information similar to conventional paper tickets, including the event name 220, event date 230, event location 240, section, seat and row assignment 250, as well as a bar code 260 to guarantee authenticity. Such electronic tickets have simplified the process for spectators and event attendees, alleviating the need to wait for tickets in the mail, or reserve tickets at will call. Rather, ticket purchasers can receive tickets and proof of purchase via e-mail and print them from their home computers. Due to the convenience of this method of ticketing, electronic tickets have largely replaced conventional paper tickets. As a result, event attendees have been robbed of the conventional paper ticket, which can serve as a valuable piece of memorabilia for a given event.

Figure 3:
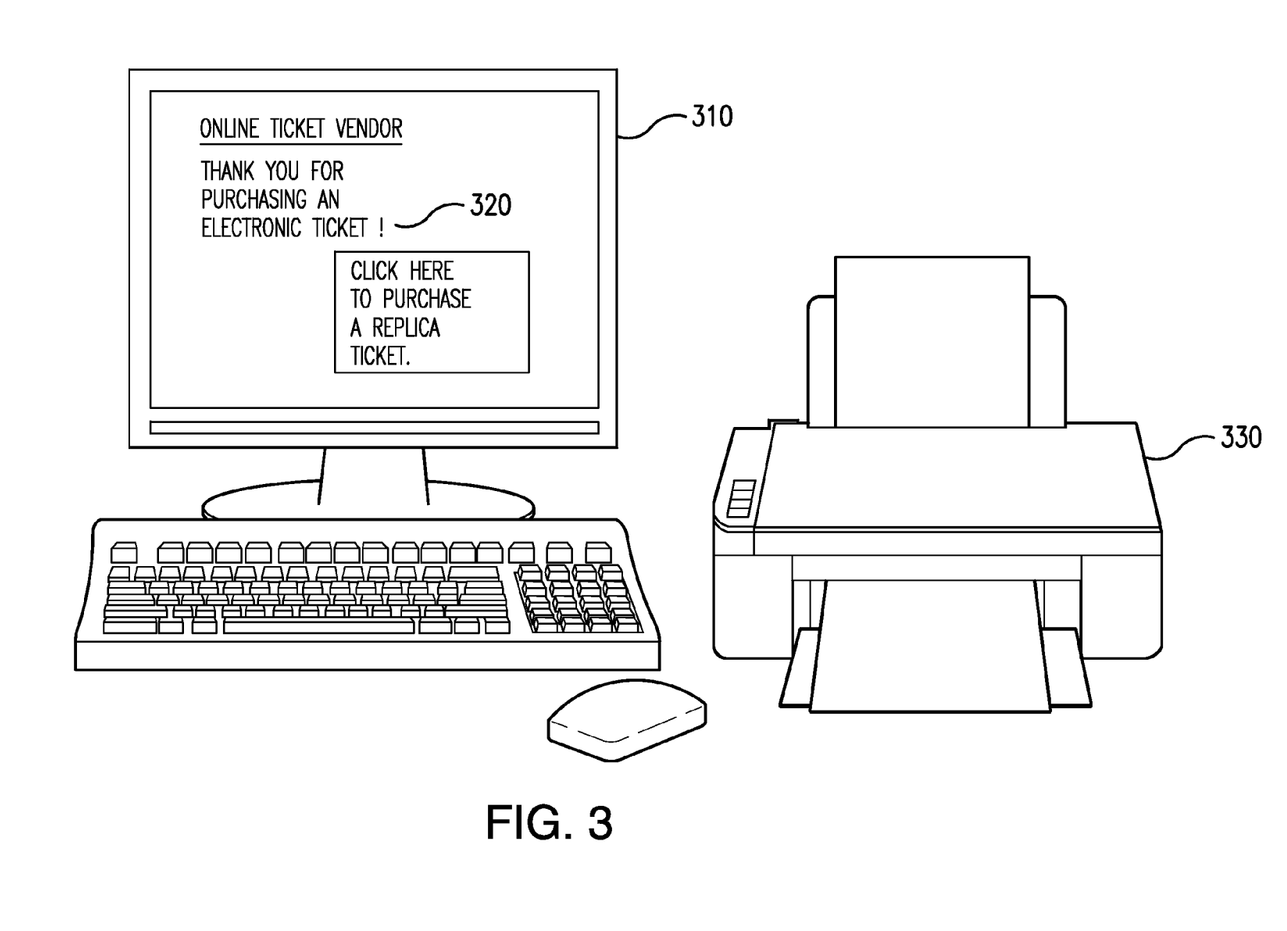
FIG. 3 illustrates an embodiment of the present invention in which the user, alongside the purchase of an electronic ticket, is given the option to receive a replica ticket.

With reference now to FIG. 3, a ticket purchaser can use a computer, or another device capable of accessing the Internet, to connect to the ticket vendor's website 310. The ticket vendor can preferably be an online hub for purchasing tickets for a wide range of events and venues, such as "Stubhub.com." The ticketing site can be an aggregator or reseller. The site can also be dedicated to one venue, team, type of event, or series of events. While purchasing an electronic ticket for the event, the website provides the option to purchase a replica ticket 320. This option can come in a myriad of forms, including a webpage during the purchasing sequence, or a prompt to open a related webpage. The option can be displayed on the same page or display that a ticket for an event is offered for purchase. The option can be displayed after the user purchases an e-ticket. A feature can also be added that permits an e-ticket purchase a limited time period after the purchase of an e-ticket to purchaser a corresponding replica ticket. The feature may be offered at a fee to e-ticket purchasers (e.g., pay a small fee to have the right to buy the replica ticket after the event). Another feature can allow an e-ticket purchaser to buy the replica tickets that only corresponding to the purchased e-tickets (cannot buy replica tickets carrying seat or admittance specific information for e-tickets purchased by someone else). If the ticket purchaser chooses to purchase a replica ticket, they can then choose how to receive the replica. The replica can either be mailed to the ticket purchaser, or sent by electronic means such as e-mail. In one embodiment, the event coordinator eliminates the risk that replicas are used to gain entry to the event by ensuring that all replicas are mailed after the event has occurred. In the alternative, the replica can be e-mailed to the ticket purchaser, and printed on printer 330.

Figure 4:
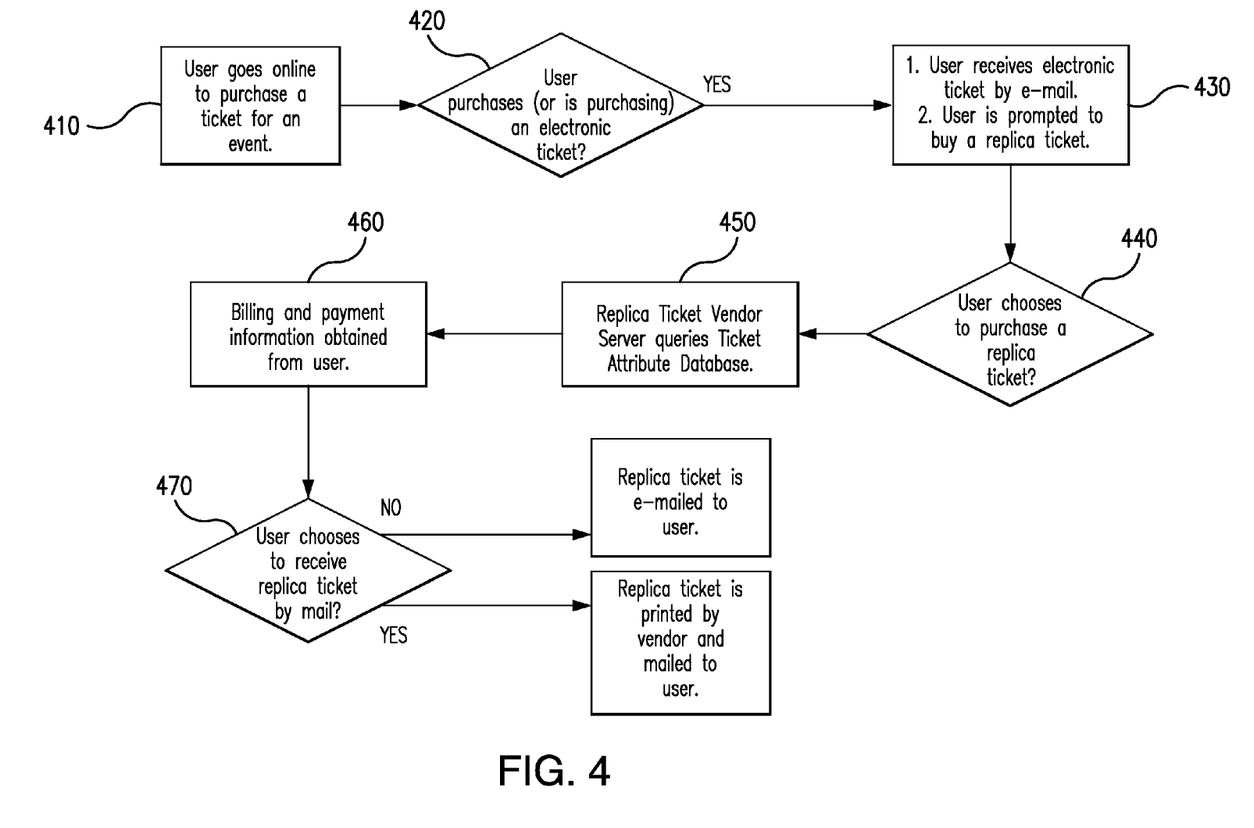
FIG. 4 is a flow chart illustrating a process for purchasing a replica ticket in accordance with embodiments of the present invention.

FIG. 4 provides a flowchart detailing the system which facilitates the purchase of a replica ticket. At step 410, the user goes online to purchase a ticket for an event. At step 420, the user is given the choice of purchasing an electronic ticket. If the user purchases a conventional paper ticket, they are sent the ticket by mail, or it is left at will call. If the user purchases an electronic ticket, they are sent an electronic ticket by e-mail, and prompted to purchase a replica ticket 430. This prompt can come by way of an on-screen advertisement, a click button, a pop-up window or any other manner that the opportunity to purchase a replica ticket may be brought to the ticket purchaser's attention. If the user chooses to purchase a replica ticket 440, the system obtains the attributes for the replica ticket. This can be done by accessing a database 450 which contains necessary data fields and corresponding data (e.g., for each event, venue, team, league, entertainer, etc.). The database contains logos relevant to sporting events and performances, such as the logos for professional sports leagues, teams, bands, and venues. This information is collected through collaboration with various organizations. The system uses the event information such as event name, event date, and venue, to determine which attributes to pull from the database. For example, tickets to a New York Mets game may require the logos of Major League Baseball, the New York Mets, and their home stadium, CitiField. This type of event information can be determined either from the information entered during purchase of the electronic ticket, or by prompting the ticket purchaser to re-enter the information. The system then obtains payment from the ticket purchaser 460, and determines whether the replica ticket is to be mailed, or e-mailed 470.

Various implementations are contemplated. For example, with reference now to FIG. 4A, certain steps of a process are identified. The steps in this FIG. 4A (or as otherwise described) can be combined in a different order or steps can be removed or added in accordance with embodiments of the present invention. At step 412, an interactive interface can be displayed that permits a user to buy an e-ticket for an event and replica ticket for the same event. The interactive interface may be provided by using a webpage or website. The interface may include an application such as an applet (e.g., an application on a mobile device). The interface can offer the user the opportunity to select to attend a list of events, which, for example, can be different types of events or venues. An interactive option can be displayed that would permit the user to purchase one or more tickets for rights to attend an event in person (e.g., a specific seat reservation). The interface may provide the user the option to purchase an e-ticket or a physical ticket. In response, to selecting to purchase an e-ticket, the interface may display to the user the option to buy a replica ticket in addition to the e-ticket. The option can be provided on the same page or screen as the option to buy an e-ticket for an event (e.g., simultaneously). Or some other relationship in time can be implemented if desired. The replica ticket option can also be presented at the same time as option to buy a ticket to an event is provided (e.g., as an element that can be added to a cart). Typically, the replica ticket would be the same ticket that the user would receive if the user chose to buy a physical ticket to attend the event (as opposed to the e-ticket). Therefore, the replica ticket would preferably be the same or would have the characteristics as if the user had purchased a physical ticket to attend the event. Buying both an e-ticket and a corresponding replica ticket would not provide the purchaser with two tickets to attend the event, but rather only one would be for receiving entry to the event (e.g., only the e-ticket). The replica ticket preferably would not have associated rights to permit the purchaser to use it to enter an event. In some embodiments, some variations can be made to the physical characteristics or material printed on the replica ticket for purposes such as authentication. In other words, a replica ticket does not have to be an exact duplicate of the physical ticket that could be purchased as opposed to an e-ticket. In response to being presented with the options or interface, the user can make selections that cause its computer or device to transmit messages that inform the ticket provider (e.g., seller, distributor, vendor, venue, ticket hub, etc.) of the user's selections.

Figure 4A:
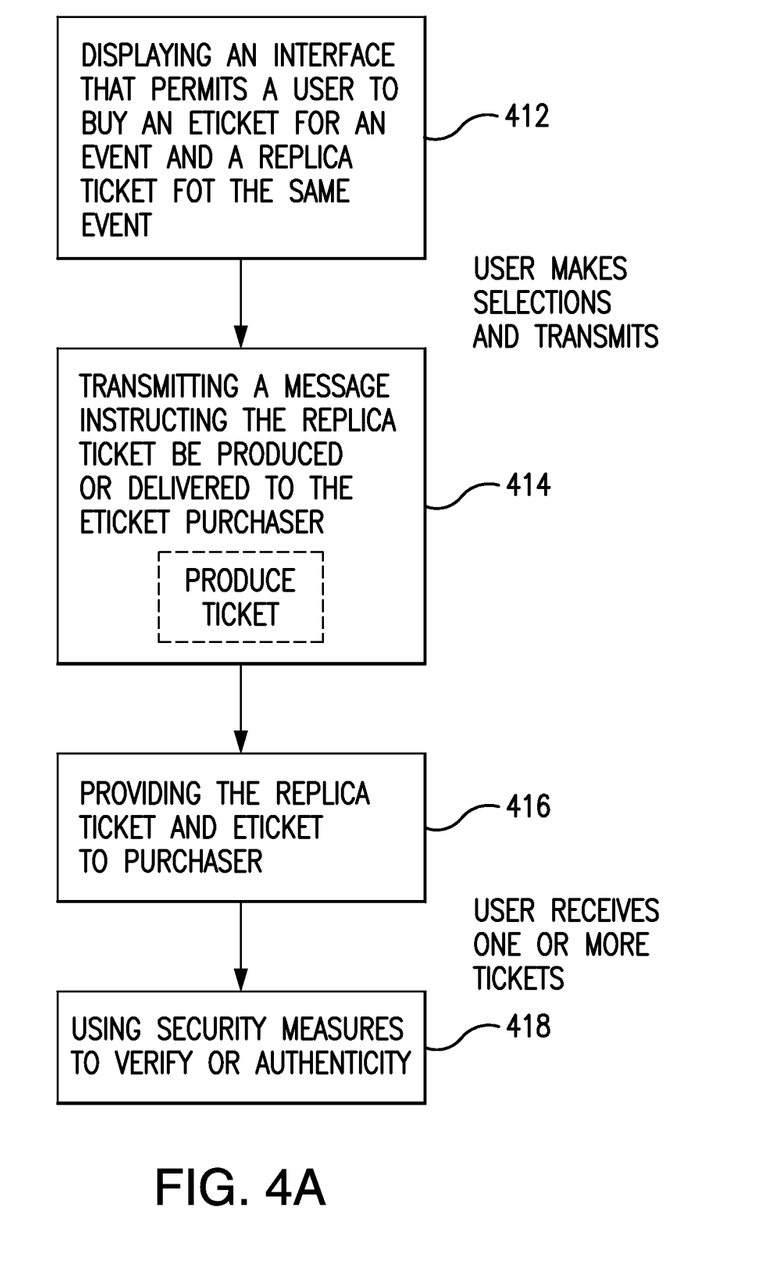
FIG. 4A is a flow chart illustrating a process for offering, selling, providing, and authenticating a replica ticket in accordance with embodiments of the present invention.

At step 414, in response to user selections, equipment of the ticket provider generates a message. The generated message provides instructions that the replica ticket be produced or delivered to the e-ticket purchaser. The message can be an internal message within a computer or network of the ticket provider or can be a message sent over a communication network of a replica ticket provider (e.g., a vendor of physical tickets). The provider equipment would be configured to be able to automatically generate these messages and send to many different replica ticket providers (dynamically) so as to be able to handle a wide array of replica tickets (e.g., venues, event types, geographic locations, etc.). If an internal message is generated, the message is used in conjunction with a database to automatically generate or produce the replica ticket. As such, step 414 can include the step of the ticket provider producing the replica ticket themselves based on stored attribute information (as opposed to relying on sending instructions to a third party).

At step 416, the replica ticket or e-ticket can be delivered to a purchaser. The e-ticket and replica ticket can be delivered at different times. The replica ticket can be physically delivered by mail or electronically delivered, e.g., using the examples given herein. At step 418, security measures printed on the replica ticket are used to verify the replica ticket or to verify authenticity of the replica ticket. Such a step can be part of making sure the replica ticket is not being used as an additional right to attend an event. Such steps can be taken after the user receives the replica ticket.

An event can be a live event involving attendance in person, but can also include other types of events such as those held electronically over the Internet.

If desired, the option to buy a replica ticket can be combined with another option such as the option to buy a replica ticket. For example, the system can automatically provide replica tickets with e-tickets. In such a case, only a single interactive option would be needed to offer the user the opportunity to buy an e-ticket and a replica ticket.

If desired, a replica ticket may include one or more pieces of ticket information common with an e-ticket that corresponds to that particular e-ticket. For example, information unique to that e-ticket can be included on the replica ticket.

A provided database can be used to pull information and used as part of the e-ticket and the replica ticket.

If desired, an interactive option can be displayed by the interface that permits the user to select to return to the website at a later date after purchasing the e-ticket to purchase the replica ticket. There may be a fee associated with selecting that option. If desired, this feature may also always be available and the user may be informed while on the site that they have a certain number of days to return to purchase the replica ticket.

Figure 5:
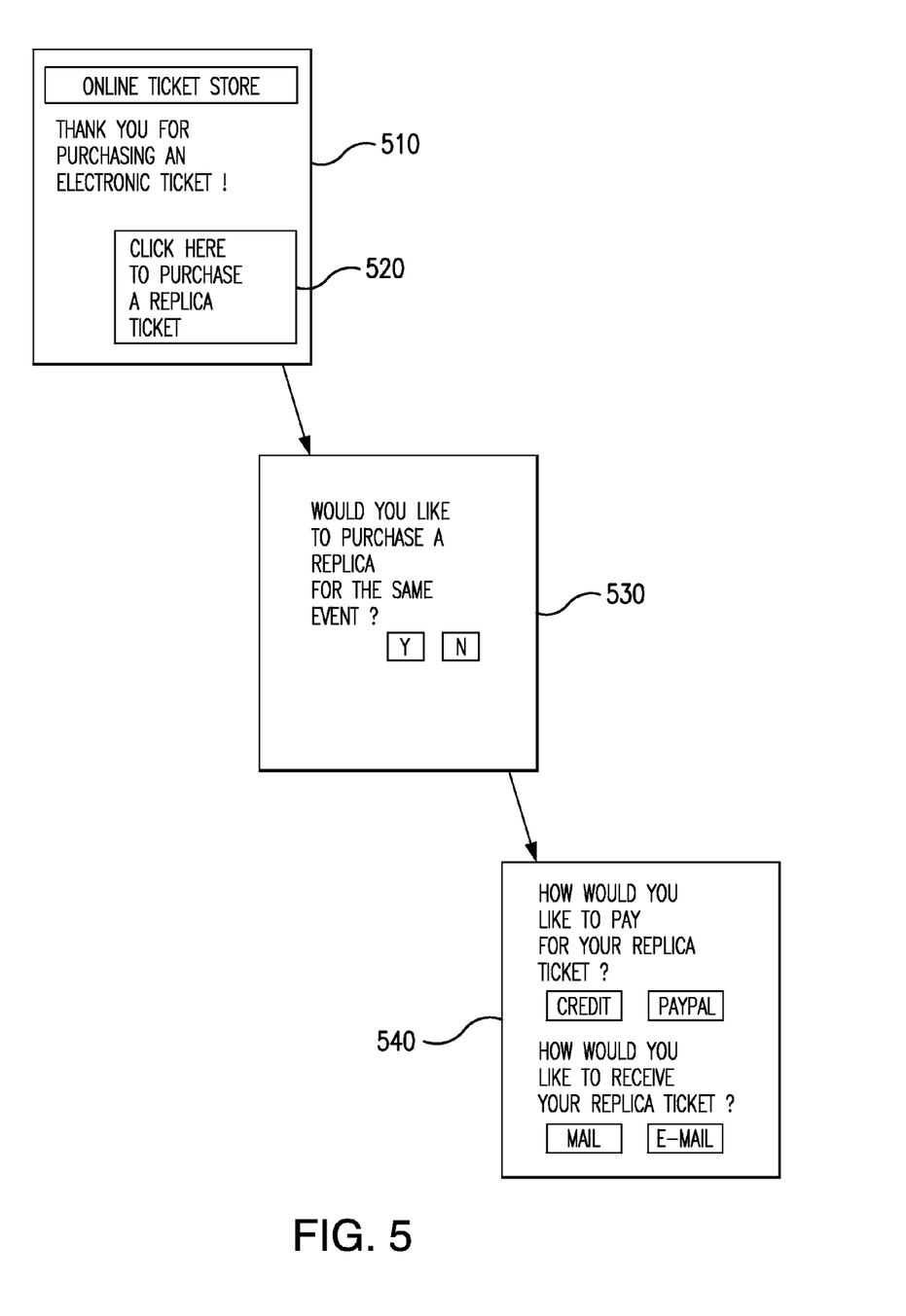
FIG. 5 illustrates an embodiment of the present invention, including the process by which a ticket purchaser is prompted to purchase a replica ticket.

FIG. 5 depicts a manner by which a ticket purchaser may be prompted to purchase a replica ticket. A ticket purchaser may visit a website to purchase an electronic ticket 510. Upon completion of the purchase, there may be a prompt asking the ticket purchaser if they wish to purchase a replica ticket 520. In one embodiment, this link may lead the purchaser to another webpage hosted by the ticket vendor, or a webpage hosted by a third party that produces replica tickets. In one embodiment, the same site that is selling the e-ticket can display an interactive option to purchase a replica ticket (e.g., on the same page, through the same interface). The option to have the right to buy the replica ticket can also be offered to be sold to others using an interactive option in connection with purchase of an e-ticket. The ticket purchaser may, for example, then be asked whether they wish to use the details of their recent purchase to obtain the attributes for their replica ticket, or whether they wish to re-enter the information 530. Billing information can be taken, and the ticket purchaser can also be asked whether they wish to receive their replica ticket by mail or e-mail 540.

Figure 6:
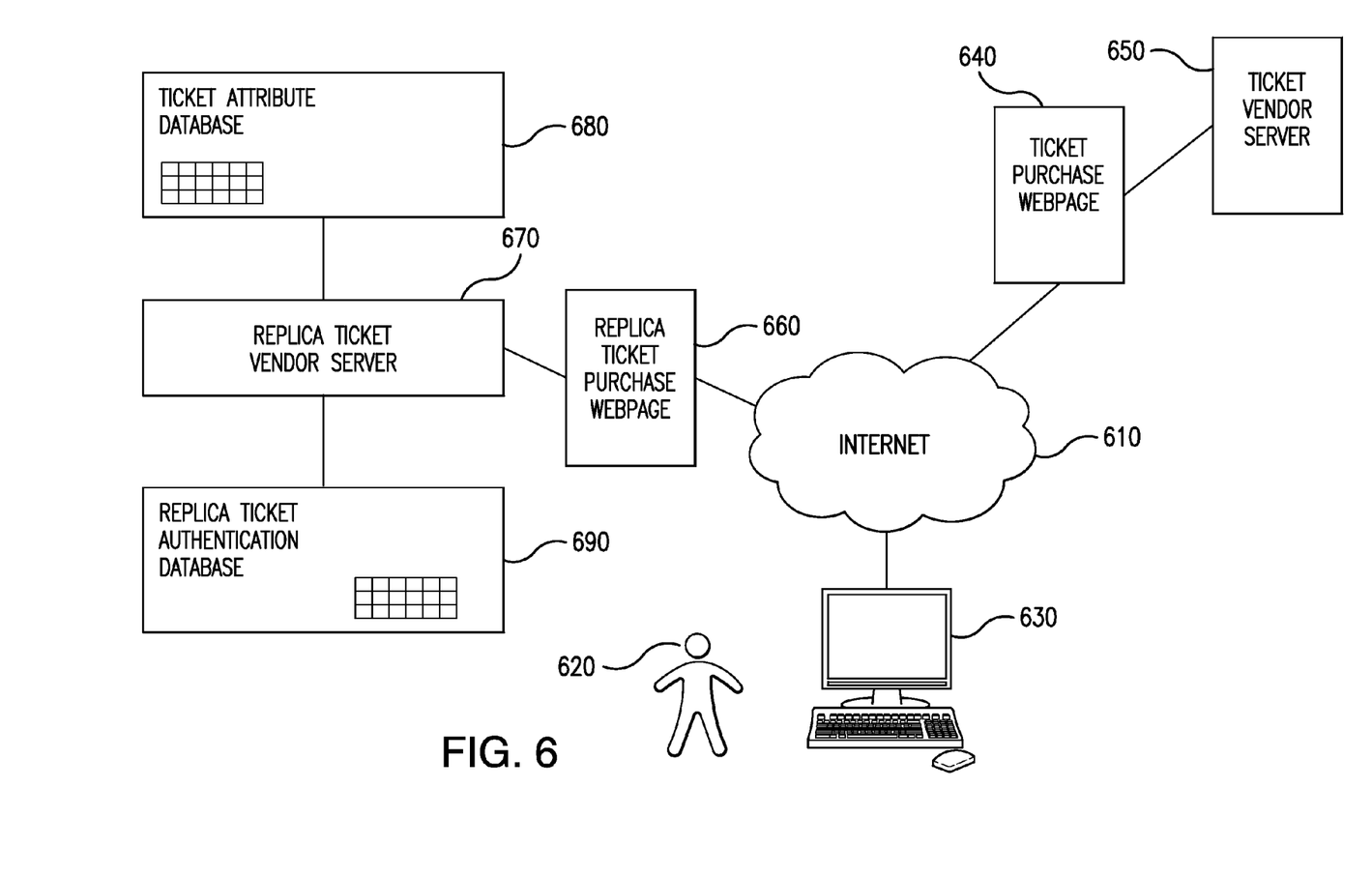
FIG. 6 illustrates the system used to provide for the exchange of data and facilitate the purchase of a replica ticket in accordance with one embodiment of the present invention.

FIG. 6 depicts the system used to provide replica tickets to the ticket purchaser. The Internet 610 provides the mode of communication for the system. The ticket purchaser 620 uses a computer 630 to access the Internet and to connect to a webpage 640 that connects to Ticket Vendor Server 650. After completing the purchase of an electronic ticket, the ticket purchaser is prompted to connect to webpage 660, which is connected to the Replica Ticket Vendor Server 670. The Ticket Vendor Server and the Replica Ticket Vendor Server can communicate through the Internet or through a separate communications path. The replica ticket vendor and ticket vendor may be the same entity, in which case they may share a server. When the ticket purchaser chooses to purchase a replica ticket, the replica ticket vendor server must obtain the attributes necessary to draw the ticket from Ticket Attribute Database 680. These attributes are compiled by Replica Ticket Vendor Server 670. They are then printed on a ticket and mailed to the ticket purchaser, or e-mailed to the ticket purchaser. In addition, a Replica Ticket Authentication Database 690 can be accessed by the Replica Ticket Server 670 to authenticate replica tickets, as discussed below. If desired, in response to a user purchasing a replica ticket in connection with an e-ticket, a message or signal can be sent, e.g., over the Internet or other communications network, that instructs one of many different vendors (e.g., each for a different team, venue, league, etc.) to print the replica ticket, ship the replica ticket, or otherwise provide the replica ticket (in response to the message or signal).

Figure 7:
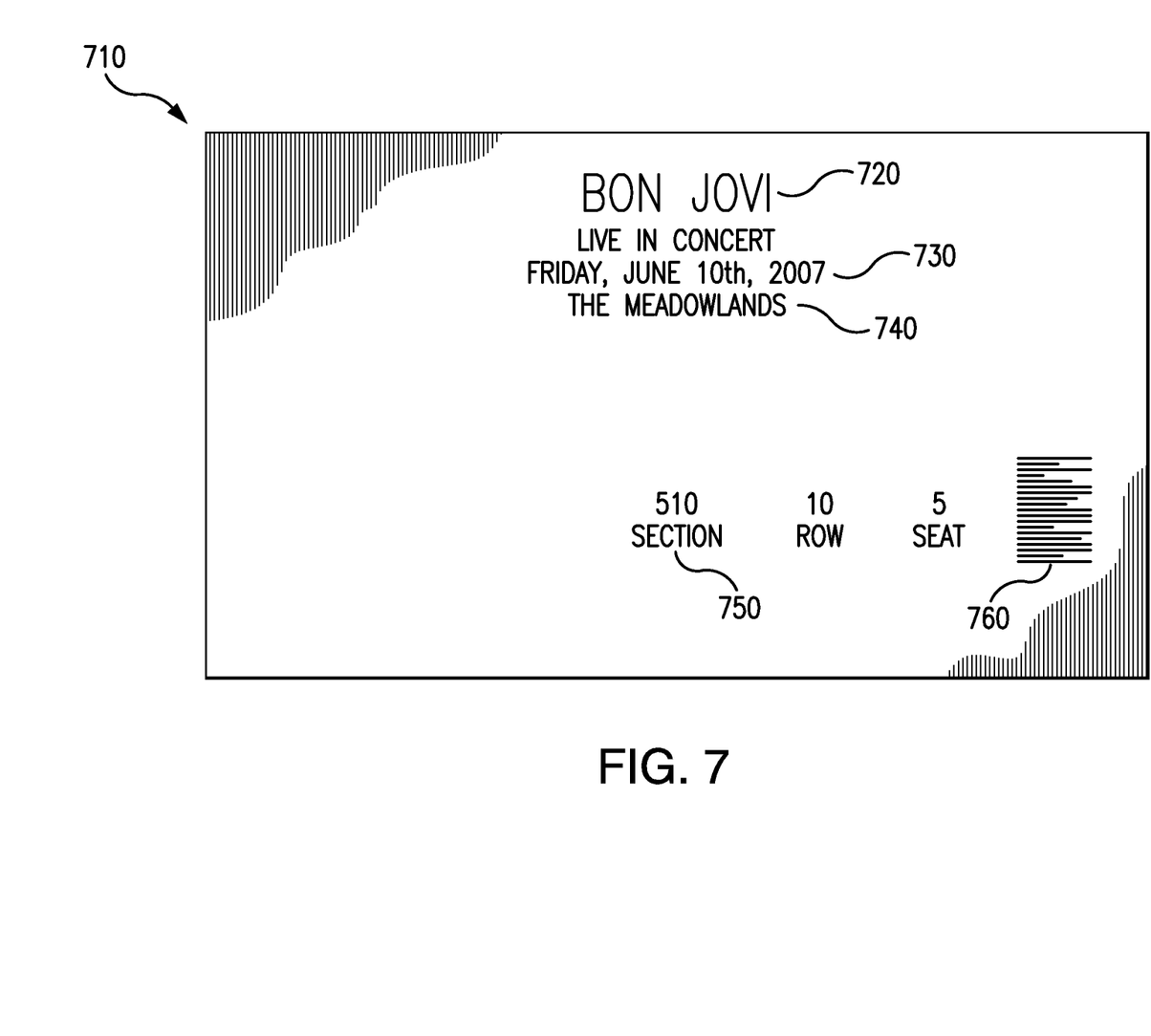
FIG. 7 illustrates a replica ticket in accordance with one embodiment of the present invention.

FIG. 7 depicts an embodiment of the replica ticket 710 of the present invention. The replica ticket preferably contains all of the information regularly included on such tickets, including event name 720, event date 730, event location 740, and section, seat and row assignment 750. In one embodiment, the replica ticket includes all of the features and marks of the electronic tickets, or conventional paper tickets being issued for the same event. In one particular embodiment, the replica ticket may include a fake bar code 760, or fake seat attributes, such that it cannot be used to gain access to the event.

In a particular embodiment, the bar code on the replica will be genuine, such that the ticket is identical to the conventional paper tickets issued for the event. In this case, the ticket purchaser may use either their electronic ticket or the replica to attend the event. If the purchaser chooses to include a genuine bar code on their replica, the website from which the replica was purchased will notify the event coordinators. The event coordinators can then use software to ensure that this bar code can be used a single time, and prevent both the electronic ticket and replica from being used for entry to the event.

Figure 8:
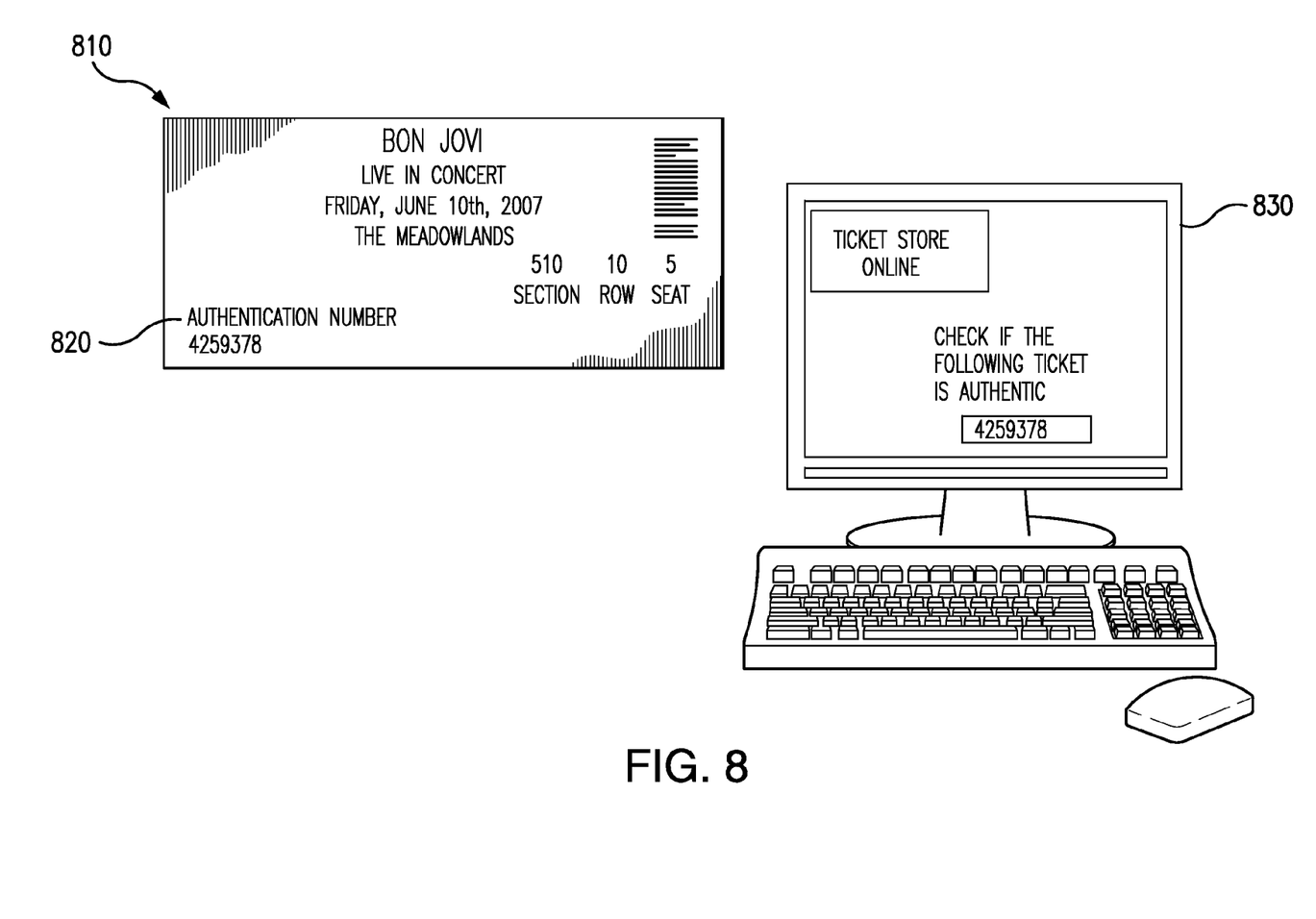
FIG. 8 illustrates an embodiment of the present invention, in which a prospective replica ticket purchaser may authenticate a replica ticket using the system of the present invention.

FIG. 8 illustrates an embodiment in which the replica ticket is given a genuine and functional bar code. In such a case, the replica ticket 810 can receive an authentication number 820. Since such a replica ticket may be resold, a potential purchaser will need a method by which to determine that the replica will provide event access. To accomplish this goal, all of the authentication numbers can be stored in a database by the event coordinator or ticket vendor. The potential purchaser can use a computer 830, or any other device which can access the Internet, to query the database. Such a query could be conducted using a webpage, or similar tool, hosted by the event coordinator or ticket vendor. The query can tell the potential purchaser whether the replica will provide access to the event, and whether the replica should be purchased for this purpose. In addition, replicas which could provide access to an event could have more value as memorabilia than replicas which could not provide such access. Collectors of such memorabilia could query the database, using the described method, to determine whether the replica has such additional value.

Figure 9:
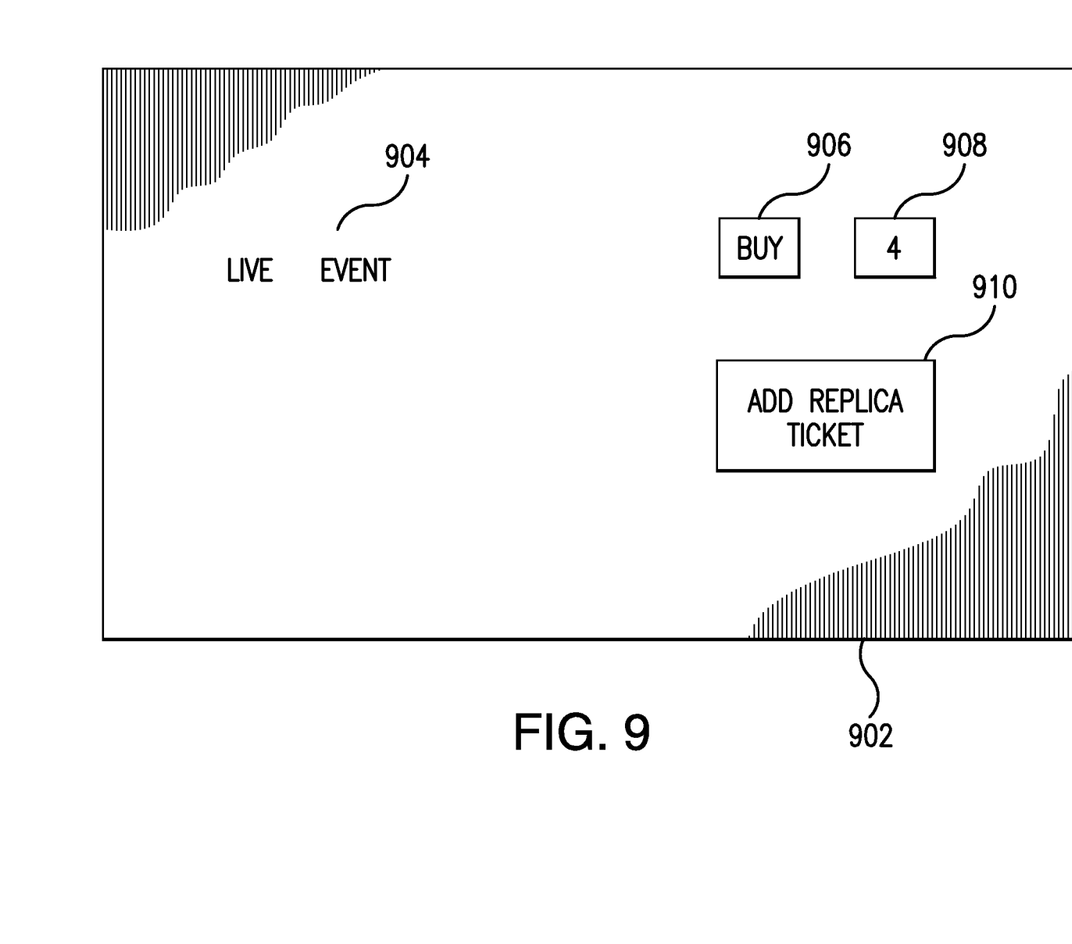
FIG. 9 illustrates an example concept view of a display screen for purchasing an e-ticket and a replica ticket in accordance with embodiments of the present invention.

FIG. 9 illustrates a display screen that can be displayed to a user. Display screen 902 can for example, be displayed on a user computer or mobile device. The screen can include information identifying live event 904. It can also include buy option 906 using which the user can use to buy a ticket (e.g., an e-ticket) to the event. Option 908 for selecting a number of attending is also displayed. Add-replica ticket 910 can be displayed on the same page to provide the user with the option to purchase a replica ticket in conjunction with the buy a ticket to attend the event. Other replica ticket related options or features can be displayed on this screen or other related screens or pages.

A replica ticket object can be sent electronically to a purchaser. The object can be one or more images or it can be a combination of images and other software such as an executable app. The object can have the necessary characteristics to have a replica ticket printed by an e-ticket purchase (e.g., a consumer) at a level of quality or appearance that is similar, or at the same level, as if it was provided by a professional vendor. The object can be stored and used (e.g., printed) at some later time (e.g., definite or indefinite term). The object could also be given electronically to a retail vendor by the purchase to have the vendor generate the replica ticket.

Processes or steps described above can be implemented using equipment and networks also described above such as by implementing one or more processes on one or more computer readable medium that stores computer readable instructions for execution by a processing system that performs the process.

Several embodiments of the present invention are specifically illustrated and/or described herein. However, it will be appreciated that modifications and variations of the present invention are covered by the above teachings and within the purview of the appended claims without departing from the spirit and intended scope of the invention.

The invention claimed is:

1. A method for generating replica tickets comprising:
   implementing a webpage that includes a first interactive option to purchase an e-ticket for one or more events;
   receiving a selection of an event for purchase of the e-ticket as part of the first interactive option;
   providing the ticket purchaser with a second interactive option to purchase a replica ticket for the selected event;
   obtaining attributes from a database to create a replica ticket for a selected event using a replica ticket vendor server;
   e-mailing both the e-ticket and data for printing the replica ticket to the ticket purchaser; and
   printing the replica ticket to the ticket purchaser.

2. The method of claim 1 in which the replica ticket is mailed to the ticket purchaser after the event has occurred.

3. The method of claim 1 in which the replica ticket contains all of the event information contained on the electronic ticket.

4. The method of claim 1, in which the replica ticket contains one of the following: a fake bar code or fake seat attributes.

5. The method of claim 4 further comprising:
   notifying the event coordinators that a replica ticket has been created; and
   using software to ensure that the electronic ticket and replica ticket facilitate allow only a single entry to the event.

6. The method of claim 4 further comprising:
   assigning an authentication number to the replica ticket;
   placing the authentication number, and information regarding whether the replica ticket could be used to gain entry to the event, in a database; and
   using the authentication number to query the database and determine if the replica ticket provides access to the event.

7. The method of claim 1, in which the replica ticket contains one of the following: a bar code, or alternate feature for authentication for gaining access to the event.

8. The method of claim 1 further comprising providing the ticket purchaser with a third interactive option that permits the ticket purchaser to return to a webpage after purchasing the e-ticket to purchase the replica ticket.

9. A system for generating replica tickets comprising:
   a computer configured to implement a webpage configured to provide a ticket purchaser with a first interactive option to purchase electronic tickets for one or more events, the computer is further configured to receive a selection of an event for purchase of the electronic ticket as part of the first interactive option and the computer is further configured to provide a second interactive option during the process of purchasing electronic tickets for purchasing a replica ticket for the selected event;
   a replica ticket vendor server; and
   a database which contains attributes necessary to create a replica ticket.

10. The system of claim 9, the replica ticket vendor server configured to print security measures on the replica ticket to authenticate the replica ticket.

11. The system of claim 9, the webpage further configured to generate a message in response to receiving the ticket purchaser selection that instructs the replica ticket be produced.

12. The system of claim 9 wherein the first interactive option automatically selects the second interactive option.

13. The system of claim 9, the webpage further configured to display the first interactive option and the second interactive option at the same time.

14. The system of claim 9 wherein the first interactive option and second interactive option are combined into a single option.

15. The system of claim 9 wherein the replica ticket includes one or more pieces of ticket information common with the e-ticket that corresponds to that particular e-ticket.

16. The system of claim 9, wherein the attributes necessary to create the replica ticket are pulled from the database and included on the e-ticket and the replica ticket.

17. The system of claim 9, the webpage further configured to provide the ticket purchaser with a third interactive option that permits the ticket purchaser to return to the webpage after purchasing the electronic tickets to purchase the replica tickets.

* * * * *